United States Patent [19]

Takahashi et al.

[11] Patent Number: 5,162,961
[45] Date of Patent: Nov. 10, 1992

[54] COMPOSITE MAGNETIC HEAD

[75] Inventors: Hideji Takahashi; Ryo Goto, both of Mouka, Japan

[73] Assignee: Hitachi Metals, Ltd., Tokyo, Japan

[21] Appl. No.: 692,556

[22] Filed: Apr. 29, 1991

[30] Foreign Application Priority Data

Apr. 28, 1990 [JP] Japan .................... 2-114409

[51] Int. Cl.$^5$ ............................... G11B 5/31
[52] U.S. Cl. ......................... 360/126; 360/120
[58] Field of Search .................. 360/120, 126

[56] References Cited

U.S. PATENT DOCUMENTS

| 4,953,051 | 8/1990 | Wada et al. | 360/126 |
| 5,001,589 | 3/1991 | Rask et al. | 360/126 |
| 5,038,242 | 8/1991 | Fukushima et al. | 360/126 |

Primary Examiner—Robert S. Tupper

[57] ABSTRACT

A composite magnetic head comprises a pair of magnetic core pieces made of an oxide-type magnetic material and bonded to each other for constituting a main magnetic circuit via a magnetic gap therebetween, and a thin, magnetic metal layer formed on a magnetic gap-opposing surface of at least one of the pair of magnetic core pieces for constituting an auxiliary magnetic circuit. The thin, magnetic metal layer has a columnar crystal structure in which the orientations of columnar crystals are substantially in perpendicular to the magnetic gap-opposing surface, and a ratio of diameter to length of each columnar crystal is substantially 0.5 or less. The reverse taper angles of the columnar crystals are preferably 0°–10° to suppress noises, reverse taper angles of the columnar crystals being 0°–10°.

4 Claims, 5 Drawing Sheets

COMPOSITE MAGNETIC HEAD

BACKGROUND OF THE INVENTION

The present invention relates to a composite magnetic head for use in magnetic disk drives, and more particularly to a composite magnetic head for use in magnetic disk drives having increased linear recording densities.

A composite magnetic head has a structure generally shown in FIG. 1, and a magnetic core for constituting a main magnetic circuit is shown in FIG. 10. The magnetic head 1 comprises a magnetic core 2 constituted by a pair of magnetic core pieces 4, 4 both made of an oxide-type magnetic material and bonded to each other via a magnetic gap 6. At least one of the magnetic core pieces 4, 4 is provided with a thin, magnetic metal layer 5 produced by a sputtering method, etc. on a surface facing the magnetic gap 6 of the magnetic core 2. This thin, magnetic metal layer 5 is usually made of a soft magnetic material based on an Fe—Al—Si alloy.

With respect to such a magnetic head having a thin, magnetic metal layer, Japanese Patent Laid-Open No. 59-160811 discloses a thin, magnetic metal layer whose columnar crystals are oriented substantially in perpendicular to a sliding surface of a magnetic recording medium. However, this orientation of the columnar crystals fails to provide the magnetic head with a sufficient performance.

Japanese Patent Laid-Open No. 61-110309 discloses a magnetic head provided with a thin, ferromagnetic metal layer having a columnar crystal structure whose orientation is substantially in perpendicular to a magnetic gap-facing surface. However, this reference fails to teach the specific structures of the columnar crystals and their effects on the performance of the magnetic head.

In such a composite magnetic head, it is known that a self-reproduced waveform suffers from noises, and that such noises are likely to cause errors in recent magnetic recording apparatuses comprising magnetic recording media having extremely increased linear recording densities.

FIG. 2 shows a waveform in the reproduction of a single pulse signal. The maximum output voltage is obtained at a position corresponding to the magnetic gap of the magnetic head, and a signal called "secondary gap pulse" (indicated by "B") is observed at a position corresponding to a boundary between the thin, magnetic metal layer and the magnetic core piece made of an oxide-type magnetic material, due to the difference in magnetic properties between them. Between the maximum output voltage peak and the secondary gap pulse B corresponding to the position of the thin, magnetic metal layer, there is a noise observed as a fluctuation (indicated by "A") of a waveform. This fluctuation has been considered to cause problems.

OBJECT AND SUMMARY OF THE INVENTION

Accordingly, an object of the present invention is to provide a composite magnetic head generating extremely reduced noises.

As a result of various investigations, the inventors have found that the causes of the above phenomenon are partly related to the metal structure of the thin, magnetic metal layer.

As shown in FIG. 3, a thin, magnetic metal layer formed by a conventional sputtering method has a structure in which crystal grains are not oriented. Accordingly, the boundaries between the crystal grains are in disorder. By means of a micro-Kerr effect observation apparatus, the magnetization process of the thin, magnetic metal layer having such a metal structure formed on a magnetic recording medium-opposing surface of the composite magnetic head was observed. As a result, it has been found that when the metal structure of the thin, magnetic metal layer is in disorder without any orientation, the disordered grain boundaries exert magnetically different influences, so that the magnetization of the thin, magnetic metal layer does not proceed substantially equally from the magnetic gap surface over the entire track width and the entire magnetic gap depth. Namely, the thin, magnetic metal layer is not magnetized uniformly in a laminar manner, and it is magnetized in a zigzag manner. Further, as a result of investigating the relation between the magnetization process of the thin, magnetic metal layer and the noise of the composite magnetic head, it has been found that the fluctuation of a waveform is caused by the uneven magnetization of the thin, magnetic metal layer.

Thus, the composite magnetic head according to the present invention comprises a pair of magnetic core pieces made of an oxide-type magnetic material and bonded to each other for constituting a main magnetic circuit via a magnetic gap therebetween, and a thin, magnetic metal layer formed on a magnetic gap-opposing surface of at least one of the pair of magnetic core pieces for constituting an auxiliary magnetic circuit, the thin, magnetic metal layer having a columnar crystal structure in which the orientations of columnar crystals are substantially in perpendicular to the magnetic gap-opposing surface, a ratio of diameter to length of each columnar crystal being substantially 0.5 or less, reverse taper angles of the columnar crystals being 0°–10°.

BRIEF DESCRIPTION OF THE DRAWINGS

FIG. 6 (b) is a photomicrograph (×25,000) showing the metal structure of the thin, magnetic metal layer of Comparative Example 1;

DETAILED DESCRIPTION OF THE PREFERRED EMBODIMENTS

Figure 5:
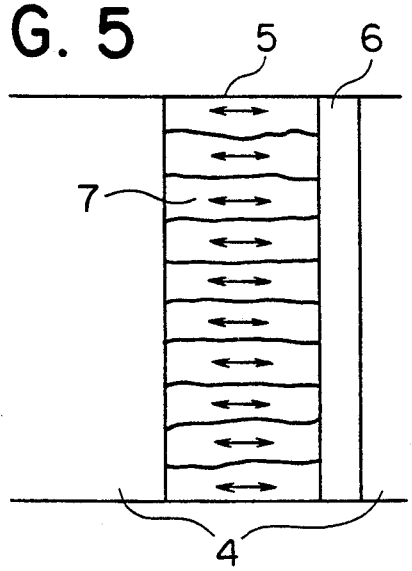
FIG. 5 is a schematic cross-sectional view showing the metal structure of the thin, magnetic metal layer according to the present invention.
Figure 6A:
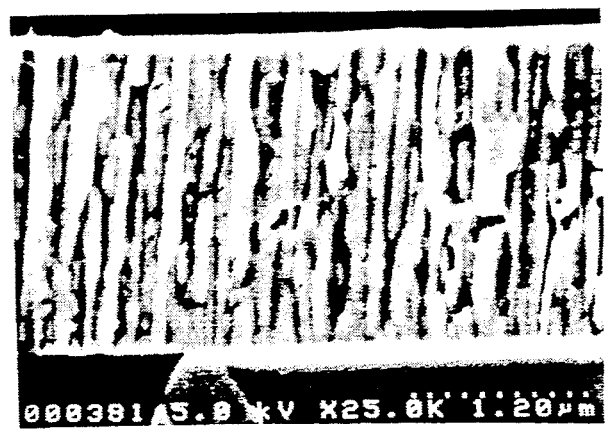
FIG. 6 (a) is a photomicrograph (×25,000) showing the metal structure of the thin, magnetic metal layer of Example 5.
Figure 6B:
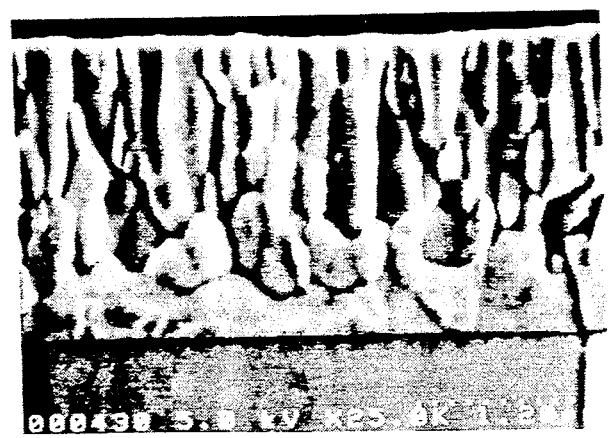
Figure 9A:
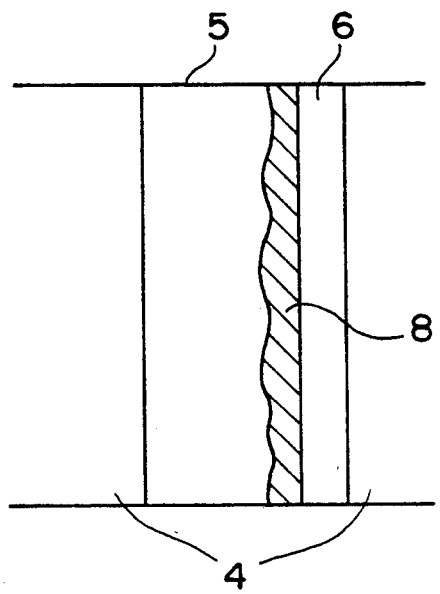
FIGS. 9 (a)-(d) are schematic cross-sectional views showing the magnetization process of the thin, magnetic metal layer of Example 5.
Figure 9B:
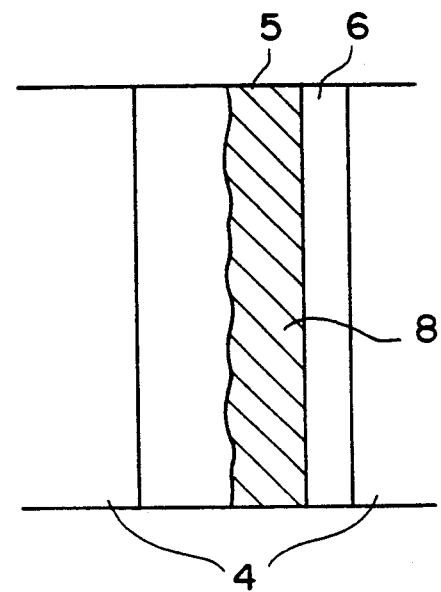
Figure 9C:
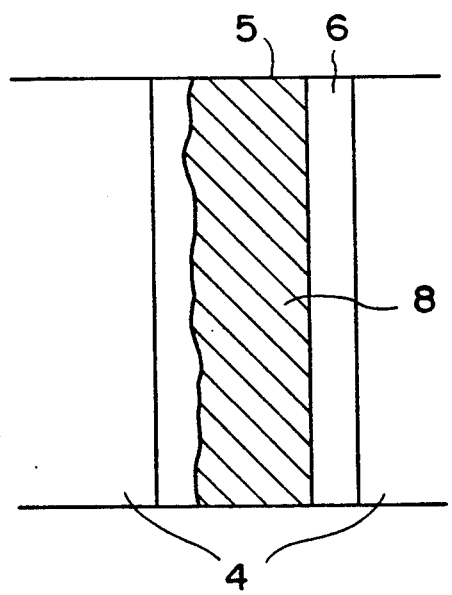
Figure 9D:
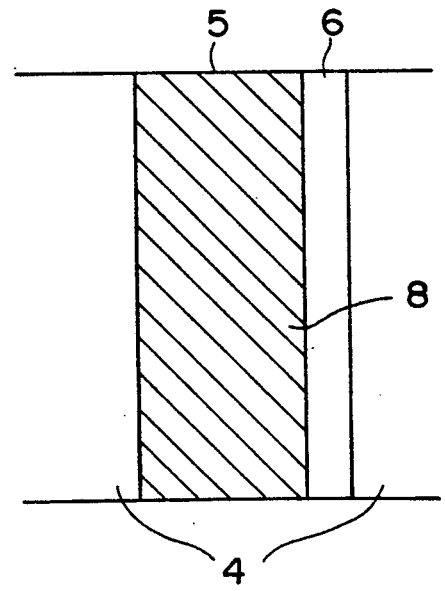
Figure 10:
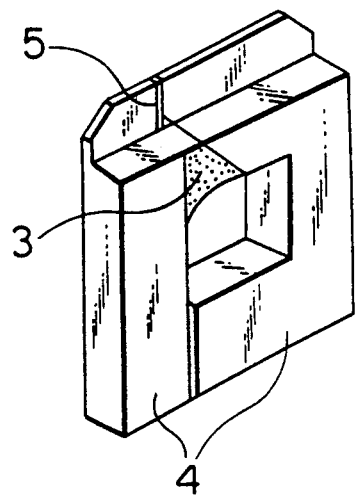
FIG. 10 is a perspective view showing a magnetic core to be fixed to a composite magnetic head.

In the present invention, the thin, magnetic metal layer has a metal structure in which columnar crystals are oriented along the thickness of the layer uniformly and continuously over the track width and the magnetic gap depth. Namely, the thin, magnetic metal layer has a metal structure as schematically shown in FIG. 5. Accordingly, there are less boundaries along the thickness of the thin, magnetic metal layer, and a very small number of boundaries cross each other in the layer. Therefore, due to the shape effect of the columnar crystals, a stable magnetization direction is in a direction perpendicular to the magnetic gap surface.

As a result, since the thin, magnetic metal layer is magnetized uniformly from the magnetic gap surface over the entire track width and the magnetic gap depth, the fluctuation of a waveform can be prevented in the recording and reproducing processes.

Figure 7:
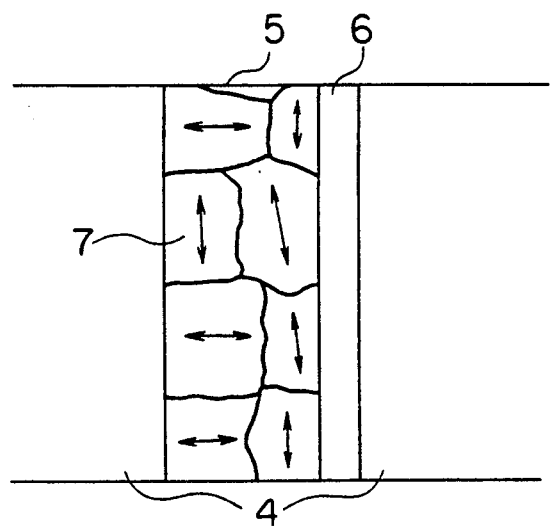
FIG. 7 is a schematic cross-sectional view showing the metal structure of a thin, magnetic metal layer in which a ratio of diameter to length of the columnar crystal is more than 0.5.
Figure 4:
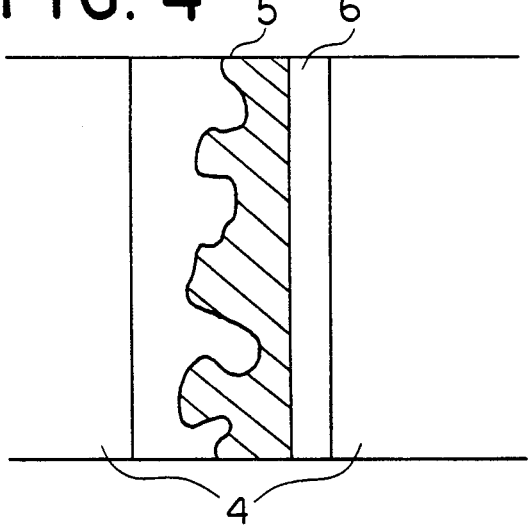
FIG. 4 is a schematic cross-sectional view showing the magnetization process of the thin, magnetic metal layer shown in FIG. 3.

Here, FIG. 7 shows a columnar crystal structure in which a ratio of diameter to length of the columnar crystal is more than 0.5. In this case, since there is little shape effect by the columnar crystals, a stable magnetization direction in the metal layer is not in perpendicular to the magnetic gap surface. Thus, a composite magnetic head having such a thin, magnetic metal layer suffers from a large fluctuation of a waveform in the process of recording and reproducing because the thin, magnetic metal layer is not magnetized in a laminar manner uniformly from the magnetic gap-facing surface over the track width and the magnetic gap depth.

Figure 11:
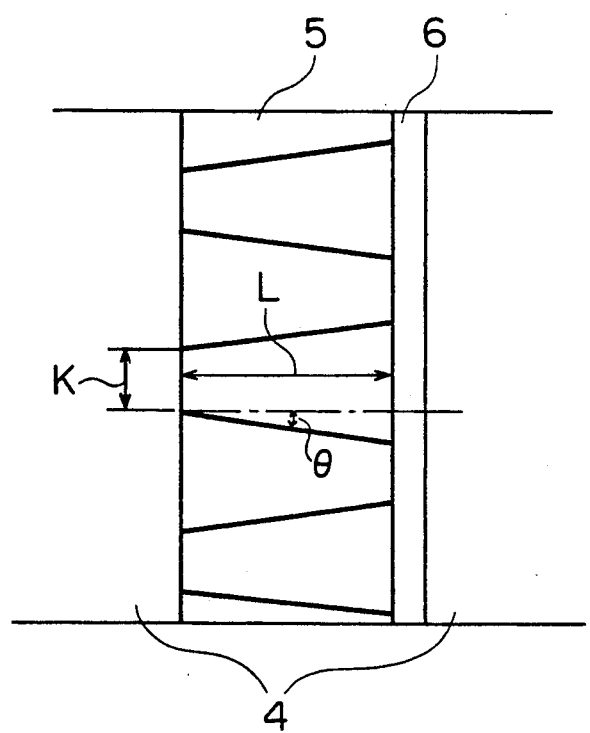
FIG. 11 is a schematic view showing the length, diameter and reverse taper angle of a columnar crystal in the thin, magnetic metal layer.

Incidentally, the length, the diameter and the reverse taper angle of the columnar crystal are defined as "L," "K" and "$\theta$," respectively, as shown in FIG. 11. Here, the reverse taper angle "$\theta$" is defined as an angle of a side wall of the columnar crystal relative to an orientation direction thereof.

Figure 8:
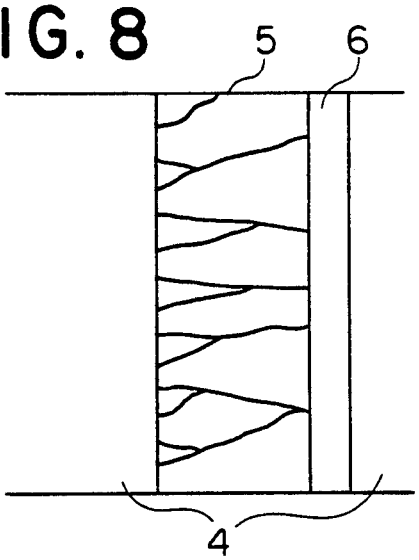
FIG. 8 is a schematic cross-sectional view showing the metal structure of a thin, magnetic metal layer in which the columnar crystals have reverse taper angles of about 20°.

FIG. 8 shows the columnar crystal structure in which the reverse taper angle of the columnar crystal is about 20°. Because of such a large reverse taper angle, some of the columnar crystals do not extend along the entire thickness of the thin, magnetic metal layer. Thus, there are a lot of grain boundaries not only in the thickness direction of the thin, magnetic metal layer but also in the depth direction of the magnetic gap. Such a defect of the metal structure prevents the thin, magnetic metal layer from being magnetized uniformly in a laminar manner. Accordingly, the reduction of the fluctuation of a waveform cannot be achieved in the process of recording and reproducing.

Incidentally, the thin, magnetic metal layer preferably has a composition consisting essentially of 4.6-8.0 weight % of Al, 4.0-9.0 weight % of Si and the balance being substantially Fe. This Fe-Al-Si alloy may further contain 2 weight % or less of at least one of Ti and Ru and/or 2-5 weight % of Cr.

To obtain the thin, magnetic metal layer having the above-described columnar crystal structure, the sputtering conditions should be controlled. One of the important parameters is an Ar gas pressure. Although the Ar gas pressure is usually about 0.05-1.0 Pa in conventional sputtering methods, it should be 1.2-3.0 Pa in the present invention. When it is less than 1.2 Pa or higher than 3.0 Pa, a good columnar crystal structure cannot be formed. The preferred Ar gas pressure is 1.2-2.2 Pa. Also, the partial pressure of $O_2$, $N_2$, $H_2O$ should be controlled in the sputtering process.

Also, the degree of vacuum and the temperature of a substrate are important. The degree of vacuum is desirably $1 \times 10^{-3}$ Pa or less, and more preferably $1 \times 10^{-4}$ Pa or less. When the degree of vacuum is higher than $1 \times 10^{-3}$ Pa, the desired columnar crystal structure cannot be obtained. In the sputtering process, the substrate (Mn-Zn ferrite) should be kept at a temperature of 200°-340° C., preferably 280°-320° C.

The present invention will be explained in further detail by way of the following Examples.

EXAMPLES 1-6, COMPARATIVE EXAMPLES 1-3

Using an Fe-Al-Si alloy target having a diameter of 76 mm and a thickness of 2 mm, a thin, magnetic metal layer of the Fe-Al-Si alloy was formed on a flat Mn-Zn ferrite substrate under sputtering conditions shown in Table 1. In this case, an Ar gas (sputtering gas) pressure was increased stepwise to produce a thin, magnetic metal layer consisting of columnar crystals.

Mn-Zn ferrite having a composition consisting of 30 mol % of MnO, 15.5 mol % of ZnO and 54.5 mol % of $Fe_2O_3$ was used to produce core pieces, and the Fe-Al-Si alloy used had a composition consisting of 85 weight % of Fe, 6 weight % of Al and 9 weight % of Si.

TABLE 1

|  | Degree of Vacuum Before Sputtering | Temperature of Substrate | Ar Gas Pressure | RF Power |
| --- | --- | --- | --- | --- |
| Comparative Example 1 | $9 \times 10^{-5}$ Pa or less | 300° C. | 0.1 Pa | 730W |
| Comparative Example 2 | $9 \times 10^{-5}$ Pa or less | 300° C. | 0.17 Pa | 730W |
| Comparative Example 3 | $9 \times 10^{-5}$ Pa or less | 300° C. | 0.5 Pa | 730W |
| Example 1 | $9 \times 10^{-5}$ Pa or less | 300° C. | 1.2 Pa | 730W |
| Example 2 | $9 \times 10^{-5}$ Pa or less | 300° C. | 1.2 Pa | 730W |
| Example 3 | $9 \times 10^{-5}$ Pa or less | 300° C. | 1.8 Pa | 730W |
| Example 4 | $9 \times 10^{-5}$ Pa or less | 300° C. | 1.8 Pa | 730W |
| Example 5 | $9 \times 10^{-5}$ Pa or less | 300° C. | 2.2 Pa | 730W |
| Example 6 | $9 \times 10^{-5}$ Pa or less | 300° C. | 2.2 Pa | 730W |

By changing the Ar gas pressure in the sputtering process under the sputtering conditions shown in Table 1, each magnetic head having a thin, magnetic metal layer was produced.

The resulting thin, magnetic metal layers each having a thickness of 2 μm had the following properties:
 $B_{10}$:10,700 G
 Hc:0.35 Oe
 $\mu_{eff}$(at 5 MHz):
  950 in easy-magnetization direction
  2240 in hard-magnetization direction.

With respect to these thin, magnetic metal layers in Examples 1-6 and Comparative Examples 1-3, their columnar crystal structures and noise levels are shown in Table 2.

TABLE 2

| | Diameter/ Length Ratio of Columnar Crystal | Reverse Taper Angle of Columnar Crystal | Noise* Level |
|---|---|---|---|
| Comparative Example 1 | Irregular Structure | | X |
| Comparative Example 2 | 0.7 | 30° | X |
| Comparative Example 3 | 0.5 | 30° | X |
| Example 1 | 0.5 | 10° | ○ |
| Example 2 | 0.5 | 0° | ○ |
| Example 3 | 0.2 | 5° | ⊙ |
| Example 4 | 0.2 | 0° | ⊙ |
| Example 5 | 0.06 | 5° | ⊙ |
| Example 6 | 0.06 | 0° | ⊙ |

Figure 1:
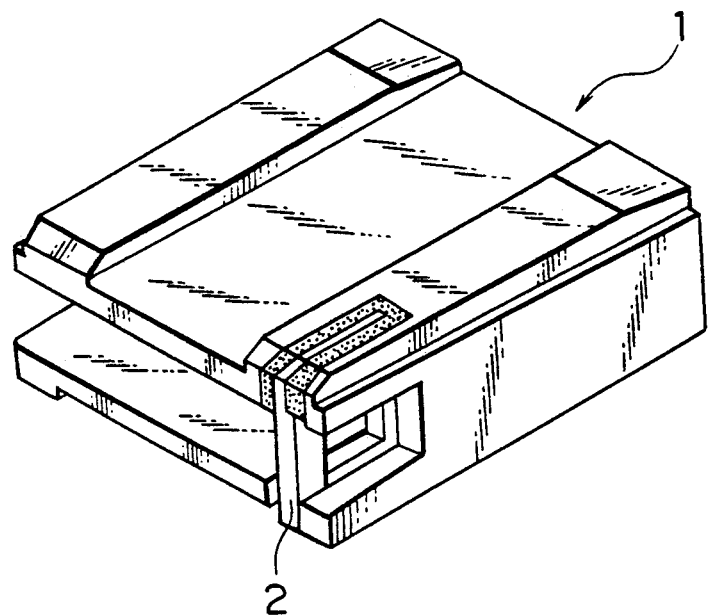
FIG. 1 is a perspective view schematically showing a composite magnetic head.
Figure 2:
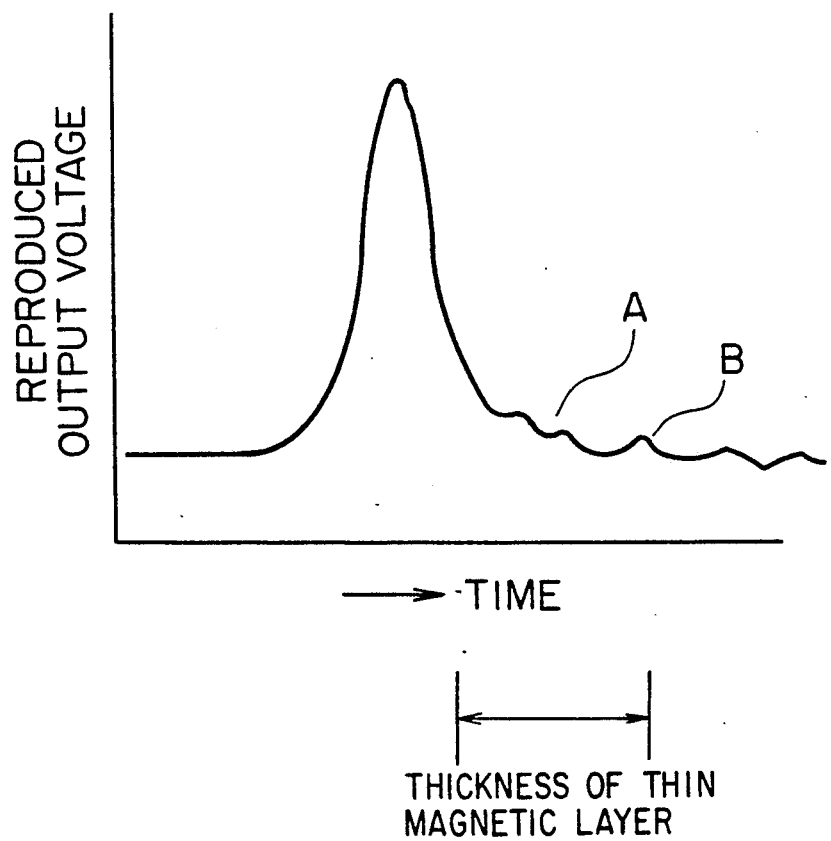
FIG. 2 is a view showing a waveform generated in the reproduction of a single pulse signal.
Figure 3:
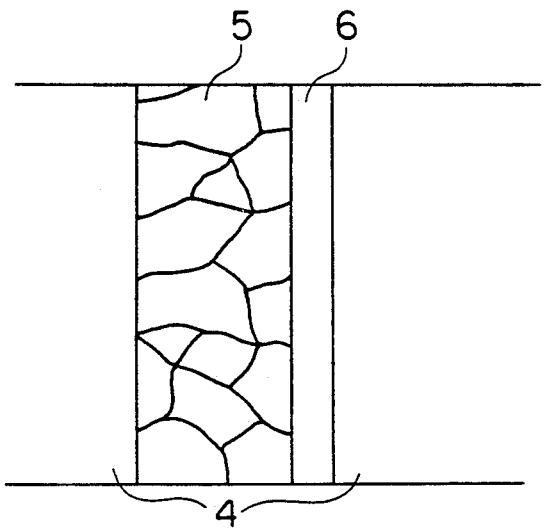
FIG. 3 is a schematic cross-sectional view showing the metal structure of a conventional thin, magnetic metal layer formed on a magnetic recording medium-opposing surface of a composite magnetic head.

Note*:
X: n ≧ 2.
○: n = 1.
⊙: n = 0.
"n" denotes the number of fluctuation peaks in the region A in FIG 2.

As is clear from the results shown in Table 2 it was confirmed that when the thin, magnetic metal layer had a columnar crystal structure in which the longitudinal directions of the columnar crystals are substantially in perpendicular to the magnetic gap surface, and when the columnar crystal had a diameter/length ratio of 0.5 or less and a reverse taper angle of 0°–10°, the resulting magnetic head showed only small reproduced waveform noise. Further, by restricting the diameter/length ratio to 0.2 or less and the reverse taper angle to 5° or less, the reproduced waveform noise of the magnetic head is greatly reduced, thereby producing a good reproduced waveform with minimized errors.

In an almost disordered metal structure of Comparative Example 1, the magnetic head suffered from extremely large noises. On the other hand, in Example 5 in which the ratio of diameter to length of the columnar crystal was about 0.06 and the reverse taper angle was about 5°, the noise level was extremely low.

The magnetization process of the thin, magnetic metal layer in Example 5 was observed by a micro-Kerr effect observation apparatus by changing a current level. As shown in FIGS. 9 (a)–(d), a magnetized area 8 expanded in parallel from the magnetic gap-facing surface toward the Mn-Zn ferrite core piece 4. At an intermediate current level, the magnetized area 8 had a substantially flat front. This means that the thin, magnetic metal layer was magnetized substantially uniformly from the magnetic gap surface.

As described above in detail, the composite magnetic head of the present invention can enjoy drastically reduced waveform signal noises in the recording and reproducing process. Therefore, reading errors of recorded signals are extremely small, ensuring a high reliability.

What is claimed is:

1. A composite magnetic head comprising a pair of magnetic core pieces made of an oxide-type magnetic material and bonded to each other for constituting a main magnetic circuit via a magnetic gap therebetween, and a thin, magnetic metal layer formed on a magnetic gap-opposing surface of at least one of said pair of magnetic core pieces for constituting an auxiliary magnetic circuit, said thin, magnetic metal layer having a columnar crystal structure in which the orientations of columnar crystals are substantially in perpendicular to said magnetic gap-opposing surface, a ratio of diameter to length of each columnar crystal being substantially 0.5 or less, and reverse taper angles of said columnar crystals being 0°–10°.

2. The composite magnetic head according to claim 1, wherein said ratio of diameter to length of each columnar crystal is substantially 0.01–0.2.

3. The composite magnetic head according to claim 1, wherein reverse taper angles of said columnar crystals are 0°–5°.

4. The composite magnetic head according to claim 2, wherein reverse taper angles of said columnar crystals are 0°–5°.

* * * * *